March 26, 1968 G. R. CALLENDER, JR 3,374,786
FRACTURED BONE SETTING FASTENER ASSEMBLY
Filed Dec. 15, 1964 2 Sheets-Sheet 1
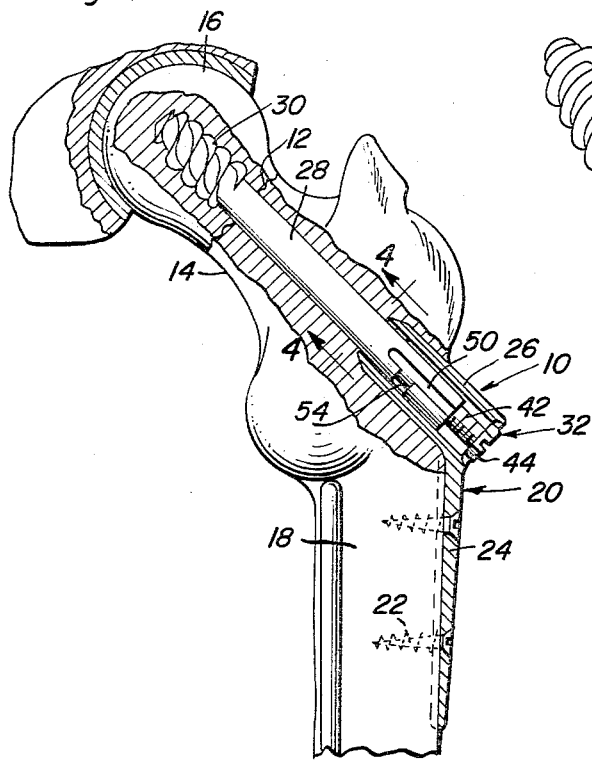
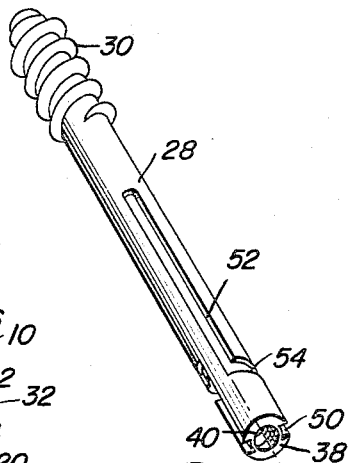
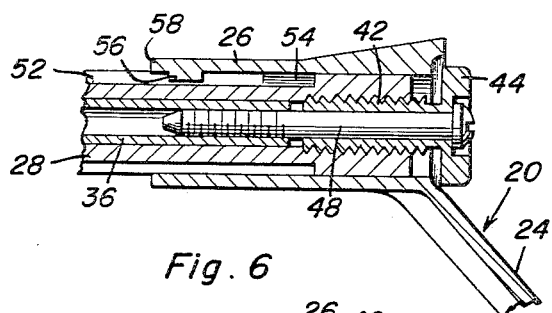
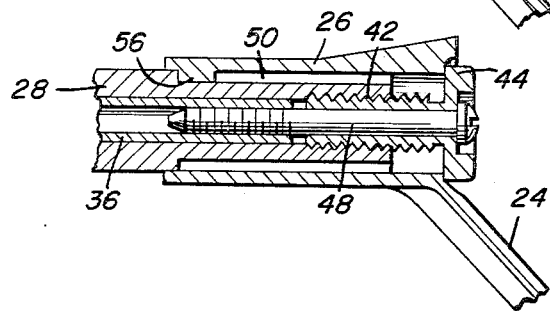
George R. Callender, Jr.
INVENTOR.
BY *O'Brien*
and *Harvey B. Jacobson*
Attorneys March 26, 1968  G. R. CALLENDER, JR  3,374,786
FRACTURED BONE SETTING FASTENER ASSEMBLY
Filed Dec. 15, 1964  2 Sheets-Sheet 2

George R. Callender, Jr.
INVENTOR.

United States Patent Office 3,374,786
Patented Mar. 26, 1968

3,374,786
FRACTURED BONE SETTING
FASTENER ASSEMBLY
George R. Callender, Jr., 1308 Quarrier St.,
Charleston, W. Va. 25301
Filed Dec. 15, 1964, Ser. No. 418,427
8 Claims. (Cl. 128—92)

ABSTRACT OF THE DISCLOSURE

A nailing apparatus for fractured femoral bones consisting of a sleeve member and a femoral fastening member, the latter having parallel slots joined at their opposite ends by a circumferential slot, the slots cooperating with a keying means on the sleeve and a limit screw attached to one end of the fastening member to alternately permit relative axial displacement of the fastening member or locking it against such movement.

This invention relates to a device for use in connection with bone surgery and more particularly to a bone setting fastener assembly for the fixation of fractured bone segments.

Surgical fastener assemblies for holding fractured bone segments in place and in particular a femur has heretofore been devised employing various adjustment features. In general, such fastener devices have employed a guide sleeve embedded in one bone segment such as the upper segment of a femur in order to non-rotatably receive and adjustably hold one end of an axially elongated shaft or nail which extends through both fractured bone segments, with the end of the shaft opposite the guide sleeve being provided with facilities for securing the shaft to the bone segment. Because of absorption occurring during the bone healing process, it has been necessary to accommodate a certain amount of telescoping movement between the shaft and the guide sleeve under certain circumstances. On the other hand, it is sometimes desirable in the setting of fractured bone segments, that the shaft be axially fixed relative to the guide sleeve requiring therefore, another type of fastener assembly. It is therefore a primary object of the present invention to provide a fastener assembly capable of being selectively conditioned to either accommodate telescoping movements as aforementioned or provide for axial locking of the shaft in an adjusted position relative to the guide sleeve. Accordingly, the surgical device of the present invention will be more widely useful and will avoid the necessity for the surgeon to make a selection of the proper bone setting device or to change the device to another type when called for.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a fractured hip bone set by use of the fastener device of the present invention, with parts broken away and shown in section.

FIGURE 2 is a perspective view of one portion of the fastener assembly.

FIGURE 3 is a perspective view of other portions of the fastener assembly.

FIGURE 5 is a partial sectional view taken substantially through a plane indicated by section line 5—5 in FIGURE 4 showing the fastener assembly in one mode of use.

FIGURE 6 is a partial sectional view similar to FIGURE 5 but showing the fastener assembly in its other mode of use.

Figure 4:
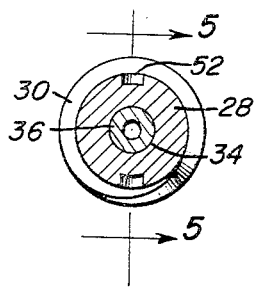
FIGURE 4 is an enlarged transverse section view taken substantially through a plane indicated by section line 4—4 in FIGURE 1.

Referring now to the drawings in detail, it will be observed that the fastener assembly generally referred to by reference numeral 10 in FIGURE 1 is installed in a typical location in order to set a fracture occurring along the fracture line 12 through a femoral neck 14 between the femoral head 16 and the upper segment 18 of a femur. The fastener assembly 10 includes a guide portion generally referred to by reference numeral 20 adapted to be fixedly secured to the upper segment of the femur by means of the fasteners 22 extending through a trochanteric plate 24 to which the sleeve member 26 of the guide portion is secured at the proper angle. The bone segment 18 is therefore bored so as to receive the sleeve member 26 and to receive the axially elongated shaft member 28 which extends from the sleeve member 26 through the femoral neck 14. The end portion of the shaft member remote from the guide sleeve 26, is embedded within the bone segment or femoral head 16 by means of a surgical screw portion 30. The opposite end of the shaft member is retained within the guide sleeve by means of an adjustable limit screw assembly 32.

With continued reference to FIGURE 1 and to FIGURES 2, 3 and 4, it will be observed that the nail or shaft member 28 has an axial bore 34 within which a rod member 36 is received with a tight fit and axially spaced from the axial end portion 38 of the shaft member so as to leave an enlarged, threaded bore portion 40 threadedly receiving the externally threaded shank portion 42 of a limit stop element having a head portion 44 adapted to abut the axial end portion 46 of the guide sleeve in order to limit axial displacement of the shaft member 28 relative to the guide sleeve in one direction. The adjustable stop element therefore forms part of the limit adjustment assembly 32 which is locked in the adjusted limit position by means of an elongated screw member 48 provided with external threads directed oppositely to the external threads 42 on the limit nut 44, the elongated screw 48 adapted to be threadedly received within the rod member 36 so as to lock the limit nut 44 in an adjusted position when the head of the elongated screw 48 abuts the nut 44 as more clearly seen in FIGURES 5 and 6.

As more clearly seen in FIGURES 1, 2 and 4, the shaft member 28 is provided with two pairs of parallel keyway grooves 50 and 52, said grooves being spaced apart by 90 degrees on the external surface of the shaft member 28. The groove 50 extends from the end portion 38 of the shaft member for a relatively short axial distance overlapping the adjacent end portion of the longer groove 52. The overlapping portions of the grooves 50 and 52 are bridged by a connecting slot 54. The longer groove 52 extends intermediate the opposite end portions of the shaft member and is longer so as to accommodate telescoping movement between the shaft member and the guide sleeve 26. Accordingly, key 56 is internally formed on the guide sleeve member adjacent the axial end 58 as more clearly seen in FIGURE 5.

FIGURE 5 therefore illustrates the fastener assembly in one mode of use wherein telescoping movement between the shaft member 28 and the guide sleeve 26 is accommodated, this being desirable for example in connection with absorption of the shaft member during the bone healing process. It will therefore be observed from FIGURE 5 that the projection 56 is received within the groove 52 so that while the head 44 of the adjustable limit nut will limit axial extension of the shaft member from the guide sleeve in one direction axial retraction into the sleeve in the other direction will be accommodated although relative angular displacement between the shaft member and the guide sleeve will be prevented. On the other hand, if it is desirable to axially lock the shaft member 28 within the guide sleeve in both directions, the projection 56 is received within the shorter groove 50 as shown in FIGURE 6 thereby limiting axial retraction of the shaft member 28 into the guide sleeve in the direction opposite to the direction in which axial extension from the sleeve is limited by the stop head 44.

Figure 10:
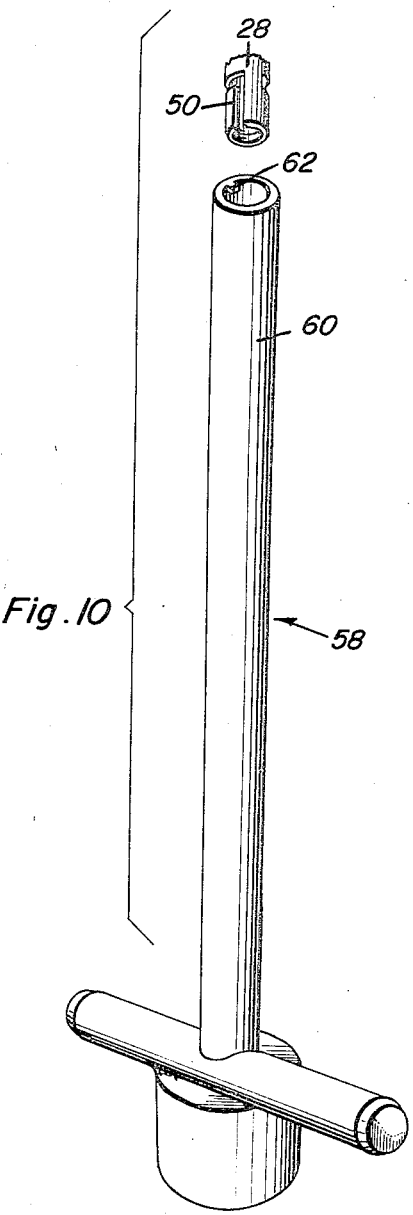
FIGURE 10 is a perspective view of the driver tool by means of which the fastener assembly is surgically installed.

It will be observed, that the shaft 28 is provided with two sets of grooves 50 and 52 spaced 180 degrees apart. The shaft 28 may therefore be installed within the fractured bone segments by a driver tool such as the tool 58 illustrated in FIGURE 10 having a tubular portion 60 with a cross-sectional dimension similar to that of the guide sleeve 26 so that the shaft member may be driven into the bone segments by rotative torque applied to the shaft member by means of the tubular portion 60 of the tool. A pair of projections 62 are therefore formed adjacent the driving end of the tubular portion 60 for reception within the two shorter grooves 50 in the shaft member. After the shaft member is so installed, the guide sleeve 26 is inserted thereover with the projection 56 being received within one of the grooves 50. If an axially fixed fastener assembly is desired, the guide sleeve 46 is merely pushed to the end of the shorter groove and the trochanteric plate 24 then secured by fasteners 22 to the upper segment of the femur 18. On the other hand, if telescoping movement between the guide sleeve and the shaft member is to be accommodated, the guide sleeve is inserted by an amount sufficient to align the projection 56 with the groove connecting slot 54 so that the guide sleeve may then be angularly displaced relative to the shaft member in order to bring the projection 56 into the longer groove 52. Axial insertion of the guide sleeve is then completed in order to bring the trochanteric plate 22 into contact with the bone segment 18.

Figure 7:
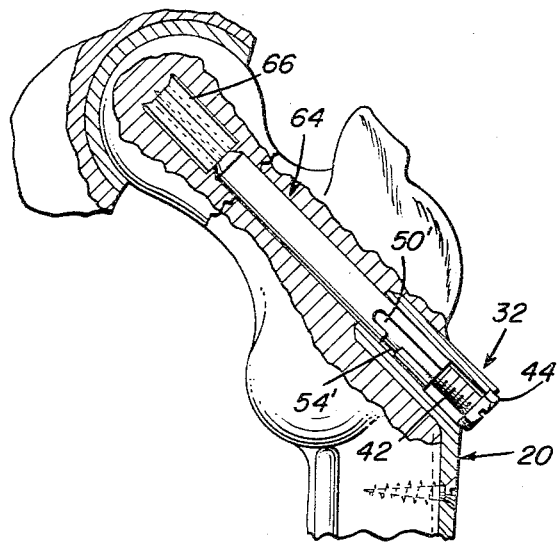
FIGURE 7 is a side elevational view with parts broken away and shown in section similar to FIGURE 1 but showing a modified form of fastener assembly.
Figure 8:
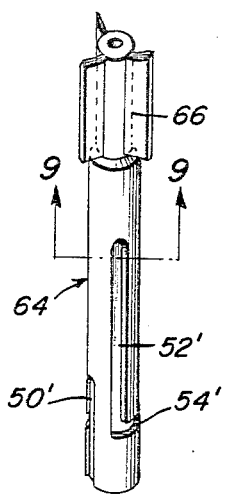
FIGURE 8 is a perspective view showing a portion of the fastener assembly illustrated in FIGURE 7.
Figure 9:
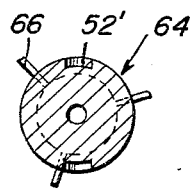
FIGURE 9 is a transverse sectional view taken substantially through a plane indicated by section line 9—9 in FIGURE 8.

FIGURES 7, 8 and 9 illustrate another form of fastener assembly in which another form of shaft member 64 is utilized. The bone embedded anchoring end portion of the shaft member 64 is provided with flange cutter elements 66 instead of the surgical screw portion 30 as described with respect to the shaft member 28. The shaft member 64 is otherwise similar in construction and use to the shaft member 28 and hence includes the parallel spaced grooves 50' and 52' with the overlapping portions thereof being bridged by the connecting slot 54'. Installation of the fastener assembly including the shaft member 64 as shown in FIGURE 7, is also the same as described with respect to FIGURES 1 through 6.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a surgical device for the fixation of fractured bones, guide means adapted to be fixedly mounted in one bone segment of a fractured bone, an axially elongated member adapted to extend from said guide means through said fractured bone, adjustable means mounted at one axial end of the axially elongated member for limiting axial displacement of the member in one direction relative to the guide means, and key means positionable relative to the guide means for alternatively locking the member against axial displacement in the other direction or accommodating axial displacement in the other direction.

2. The combination of claim 1 wherein said key means includes, a relatively short groove on the elongated member extending from said one end thereof, a relatively long groove on the elongated member extending in parallel spaced relation to said short groove intermediate the axial ends of the member, a connecting slot bridging overlapping portions of said grooves, and a projection extending from the guide means into one of said grooves for preventing angular displacement of the member relative to the guide means, said member being angularly displaceable relative to the guide means when the projection is disposed within said connecting slot upon aixal positioning of the member relative to guide means at a predetermined location.

3. A surgical device for the fixation of fractured bones comprising, guide means adapted to be fixedly secured to one bone segment of a fractured bone, said guide means having a sleeve member extending into said bone segment, an axially elongated shaft member slidably received in and projecting from said sleeve member, said shaft member having a bone anchoring end portion remote from the sleeve member adapted to be embedded in the other bone segment of said fractured bone, limit means mounted on an end portion of the shaft member opposite said anchoring end portion for engagement with the guide means to limit axial extension of the shaft member in one direction from the sleeve member, and relatively positionable key means mounted on the sleeve and shaft members for alternatively accommodating telescoping movement between the members and axially locking the members against relative axial movement in both directions.

4. The combination of claim 3 wherein said key means comprises, a pair of elongated grooves axially spaced from the anchoring end portion of the shaft member and formed on one of said guide and shaft members, a projection formed on the other of said members and extending into one of said grooves to prevent relative angular displacement between said members, said grooves having overlapping portions, and means bridging said overlapping portions of the grooves for selective angular displacement of the projection between said grooves.

5. The combination of claim 4 wherein one of said grooves extends from the opposite end portion of the shaft member and is shorter in length than the other of said grooves to limit axial retraction of the shaft member into the sleeve member.

6. The combination of claim 5 wherein said limit means comprises a stop element connected to the shaft member and projecting from the sleeve member in a direction opposite to the shaft member, said stop element having a head portion adapted to abut the sleeve member to limit axial extension of the shaft member.

7. The combination of claim 3 wherein said limit means comprises a stop element connected to the shaft member and projecting from the sleeve member in a direction opposite to the shaft member, said stop element having a head portion adapted to abut the sleeve member to limit axial extension of the shaft member.

8. In a device for fixation of fractured bones having a nail for penetration into a bone, said nail being provided with a groove terminating in spaced relation to one end thereof and a guide sleeve provided with a key slidably received in said groove to hold the nail in axially slidable relationship to the sleeve, the improvement comprising, a second groove formed in the nail parallel to said first mentioned groove extending from said one end of the nail into overlapping relationship to said first mentioned groove, a connecting slot formed in the nail bridging overlapping portions of said grooves and stop means connected to the nail for abutment with the sleeve to limit axial extension of the nail from the sleeve when the key is in the first mentioned groove and axially lock the nail when the key is in the second groove, the key being angularly displaceable between said grooves through the connecting slot when the nail is in an axial position aligning the key with the slot.

References Cited
UNITED STATES PATENTS

| | | | |
|---|---|---|---|
| 662,748 | 11/1900 | Wood | 287—103 |
| 1,033,187 | 7/1912 | Metzger | 287—103 |
| 2,702,543 | 2/1955 | Pugh et al. | 128—92 |
| 3,029,811 | 4/1962 | Yost | 128—92 |
| 3,107,666 | 10/1963 | Cecere et al. | 128—92 |

RICHARD A. GAUDET, *Primary Examiner.*

J. W. HINEY, *Assistant Examiner.*